(12) United States Patent
Luse et al.

(10) Patent No.: US 11,775,887 B2
(45) Date of Patent: Oct. 3, 2023

(54) METHODS AND SYSTEMS FOR PROCESSING DATA HAVING VARIED TEMPORAL CHARACTERISTICS TO GENERATE PREDICTIONS RELATED TO MANAGEMENT ARRANGEMENTS USING RANDOM FOREST CLASSIFIERS

(71) Applicant: UBS Business Solutions AG, Zurich (CH)

(72) Inventors: Hayden Thomas Luse, New York, NY (US); David Andrew DiCiurcio, Long Island City, NY (US); Ronald Jansen, Scarsdale, NY (US)

(73) Assignee: UBS Business Solutions AG, Zurich (CH)

( * ) Notice: Subject to any disclaimer, the term of this patent is extended or adjusted under 35 U.S.C. 154(b) by 615 days.

(21) Appl. No.: 16/810,724

(22) Filed: Mar. 5, 2020

(65) Prior Publication Data
US 2021/0279598 A1 Sep. 9, 2021

(51) Int. Cl.
| | |
|---|---|
| *G06Q 10/06* | (2023.01) |
| *G06Q 10/04* | (2023.01) |
| *G06N 20/20* | (2019.01) |
| *G06N 20/10* | (2019.01) |
| *G06F 18/22* | (2023.01) |
| *G06N 5/01* | (2023.01) |
| *G06N 7/01* | (2023.01) |

(52) U.S. Cl.
CPC .............. *G06Q 10/04* (2013.01); *G06F 18/22* (2023.01); *G06N 5/01* (2023.01); *G06N 7/01* (2023.01); *G06N 20/10* (2019.01); *G06N 20/20* (2019.01)

(58) Field of Classification Search
CPC ...................................................... G06Q 10/06
USPC ...................................................... 705/7.22
See application file for complete search history.

(56) References Cited

U.S. PATENT DOCUMENTS

| | | | |
|---|---|---|---|
| 10,628,748 B2* | 4/2020 | Yu | G06K 9/6256 |
| 2019/0239158 A1 | 8/2019 | Wulff et al. | |
| 2020/0364609 A1* | 11/2020 | Scriven | G06F 40/40 |
| 2020/0394711 A1* | 12/2020 | Rudd | G06N 3/0454 |

(Continued)

OTHER PUBLICATIONS

World Intellectual Property Office International Bureau International Searching Authority International Search Report and Written Opinion dated May 6, 2021 in related Patent Cooperation Treaty Application Serial No. PCT/IB2021/051787 filed Mar. 4, 2021.

(Continued)

*Primary Examiner* — Nga B Nguyen
(74) *Attorney, Agent, or Firm* — Pillsbury Winthrop Shaw Pittman LLP

(57) ABSTRACT

Methods and systems are described for processing data having varied temporal characteristics to generate predictions related to management arrangements using random forest classifiers. For example, the system may receive first data related to a first management arrangement of a first entity and a second management arrangement of a second entity. The system may receive an output from the random forest classifier related to a predicted second management transformation. The system may then generate for display, in a user interface, a prediction based on the predicted second management transformation.

20 Claims, 6 Drawing Sheets

(56) References Cited

U.S. PATENT DOCUMENTS

2021/0035693 A1\* 2/2021 Mohammad ........... G16H 10/60
2021/0241137 A1\* 8/2021 Jain ....................... G16H 20/70

OTHER PUBLICATIONS

The International Bureau of the World Intellectual Property Office Notification Concerning Transmittal of International Preliminary Report on Patentability (Chapter I of the Patent Cooperation Treaty) dated Sep. 15, 2022 in related Patent Cooperation Treaty Application Serial No. PCT/IB2021/051787 filed Mar. 4, 2021.

\* cited by examiner

METHODS AND SYSTEMS FOR PROCESSING DATA HAVING VARIED TEMPORAL CHARACTERISTICS TO GENERATE PREDICTIONS RELATED TO MANAGEMENT ARRANGEMENTS USING RANDOM FOREST CLASSIFIERS

FIELD OF THE INVENTION

The invention relates to processing data having varied temporal characteristics to generate predictions related to management arrangements using random forest classifiers.

BACKGROUND

In recent years, data processing and techniques for data processing have seen an increase in importance and applicability to computer applications for a variety of purposes. Nonetheless, the ever-increasing sizes of these data sets and processing power required for processing these data sets to meet the demands of the new applications continues to pose a problem for developers.

SUMMARY

In view of this problem, methods and systems for improvements in data processing are disclosed herein. In particular, these improvements are achieved through processing data having varied temporal characteristics to generate predictions. The aforementioned data processing is especially relevant to applications used to generate predictions related to management arrangements. For example, applications related to management arrangements (e.g., composition of decision-making bodies and/or other control system of an entity) and/or management transformations (e.g., changes in management arrangements of entities based on investor activism) of an entity have specific requirements for machine learning models in that these models must generate reliable predictions, often with limited training data, and must provide visibility into features responsible for the predictions and/or the features that impact given predictions.

The methods and system described herein further relate to the use of models based on random forest classifiers. However, the use of models based on random forest classifiers for applications related to management arrangements creates an additional technical hurdle. Specifically, applications related to management arrangements require a temporal characteristic (i.e., data is correlated to a specific time/date and the model must account for this correlation in order to make predictions). Without proper preservation of this temporal characteristic, applications related to management arrangements cannot be achieved and/or predictions related to future time periods cannot be made. This is particularly problematic for models based on random forest classifiers. Random forest classifiers are conventionally limited in their ability to make predictions based on future points in a time-series. That is, random forest classifiers are limited to classification of a current time. For example, random forest classifiers have no awareness of time. Instead, the random forest classifier takes observations to be independent and identically distributed, in contrast to time series data which is characterized by serial dependence.

To overcome this limitation, the system and methods training data for the random forest classifier is pre-processed to make each feature vector indexed by time. For example, the feature vector for a given entity may include management arrangement data, which may include fundamental data, income data, market data, trading volume data, shareholder rights data, structure data, size/length of the tenure, number of affiliations, and/or any other data related to management arrangements. As described below, this pre-processing may include one of more of statistical transformations, detrending, time delay embedding, or feature engineering. Following the pre-processing, a model using a random forest classifier may then be trained.

The trained model may then achieve one or more benefits when applied to applications related to management arrangements. First, the model may provide predictions for not only the likely success of a management transformation (e.g., the likelihood of success of a launched activism campaign), but how likely a management transformation is to occur (e.g., the likelihood that an activism campaign will be launched). Second, the model may provide multiple interpretation tools comparing current entities and/or the management arrangements and management arrangement data for those entities to historical management arrangements and management arrangement data of entities that featured a management transformation in order to provide predictions for the current entity. Additionally or alternatively, the model may provide interpretation tools identifying an impact of a given feature (e.g., a category and/or value of management arrangement data) on a likelihood of success or occurrence of a management transformation. Third, the model may provide outputs that through post-processing may be adjusted based on a given time series as well as other factors (e.g., geographic considerations) to allow the model to be adjustable for particular circumstances.

In some aspects, systems and methods are described for processing data having varied temporal characteristics to generate predictions related to management arrangements using random forest classifiers. For example, the system may receive first data related to a first management arrangement of a first entity, wherein the first data comprises a first temporal characteristic and a first management transformation of the first entity. The system may generate a first feature vector for the first data, wherein a first element of the first feature vector corresponds to the first temporal characteristic. The system may train a random forest classifier based on the first feature vector to classify the first data as corresponding to the first management transformation. The system may receive second data related to a second management arrangement of a second entity, wherein the second data comprises a second temporal characteristic and an unknown management transformation of the second entity. The system may generate a second feature vector for the second data, wherein a second element of the second feature vector corresponds to the second temporal characteristic. The system may input the second feature vector into the random forest classifier. The system may receive an output from the random forest classifier related to a predicted second management transformation. The system may generate for display, in a user interface, a prediction based on the predicted second management transformation.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
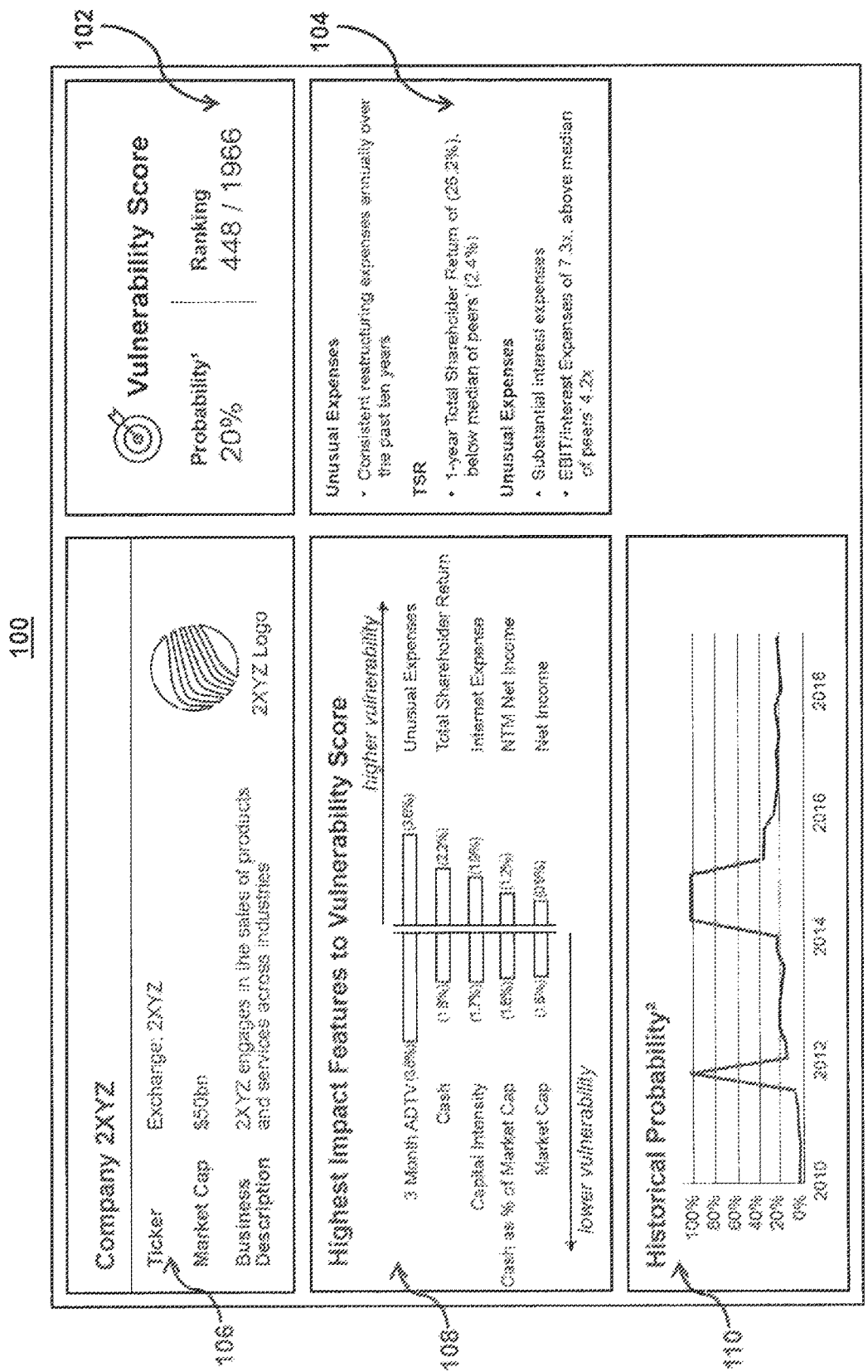
FIG. 1 shows an illustrative example of a user interface for accessing predictions based on the predicted second management transformation, in accordance with one or more embodiments.

FIG. 1 shows an illustrative example of a user interface for accessing predictions based on the predicted second management transformation, in accordance with one or more embodiments. For example, the system may generate for display respective predictions for a one or more entities based on publicly available data related to management arrangements for the plurality of entities. Additionally or alternatively, the system may rank an entity among the plurality of entities based on a comparison of a prediction for the entity and the other respective predictions. For example, user interface 100 includes numerous predictions and management arrangement data related to management arrangements of entity and management transformations. The instance of user interface 100 may represent an analysis that quantifies how various actions available to the entity impact its likelihood of a management transformation. As discussed in relation to FIG. 3, the model and/or predictions generated by the model are backtested and can provide and predict activism in advance. The application generates predictions, but also provides built-in analytics with unique insights into the underlying causes of management transformations.

As referred to herein, a management arrangement of an entity includes an organization of the entity, an administration scheme used by the entity, and/or personnel occupying control or management interests of an entity. For example, the management arrangement of an entity may include how the entity is managed, administered, or organized, whether the entity is a business, a not-for-profit organization, or government body. Management includes the activities of setting the strategy of an organization and coordinating the efforts of its employees (or of volunteers) to accomplish its objectives through the application of available resources, such as financial, natural, technological, and human resources. Management arrangement may also refer to those people who manage an organization and/or the position in the entity of those people. An entity includes any business, partnership, a not-for-profit organization, government body, and/or other grouping of people and resources for a goal. As referred to herein a management transformation includes launching of an activism campaign. An activism campaign may comprise an investor or shareholder acquiring a partial or controlling interest in an entity to use as leverage to change the management arrangement of the entity. As referred to herein, management arrangement data may include fundamental data, income data, market data, trading volume data, shareholder rights data, structure data, size/length of the tenure, number of affiliations, and/or any other data related to management arrangements. The management arrangement data may be pre-processed to be indexed by time.

Prediction 102 includes a probability of a management transformation for an entity as well as a ranking of the likelihood of a management transformation of the entity among a plurality of other entities. For example, user interface 100 may be generated by an application as described herein. The application may an analytical platform for quantifying the risk that entities will become activism targets and/or undergo a management transformation. User interface 100 may be based on a machine learning model (e.g., as discusses below in FIG. 3) that analyzes historical management transformations (e.g., launching of activism campaigns) in conjunction with large amounts of data about public entities. The application may calculate the probability of management transformations for a wide range of public entities in the disperse geographic areas. Manage arrangement data 106 may include an entity name or other identifier and/or information about the entity such as stock price, valuation, and/or other information.

Predictions 104 and 108 may include features (e.g., categories and/or values of management arrangement data) that are particularly relevant or highly impactful on management transformations. For example, prediction 108 may include key qualitative or quantitative metrics that are highly correlated with management transformations. Prediction 110 may include historical probability of a management transformation. In some embodiments, prediction 110 may include probabilities and predictions that are based on a specific time point in a time series (e.g., as discussed in FIG. 3 below).

Figure 2:
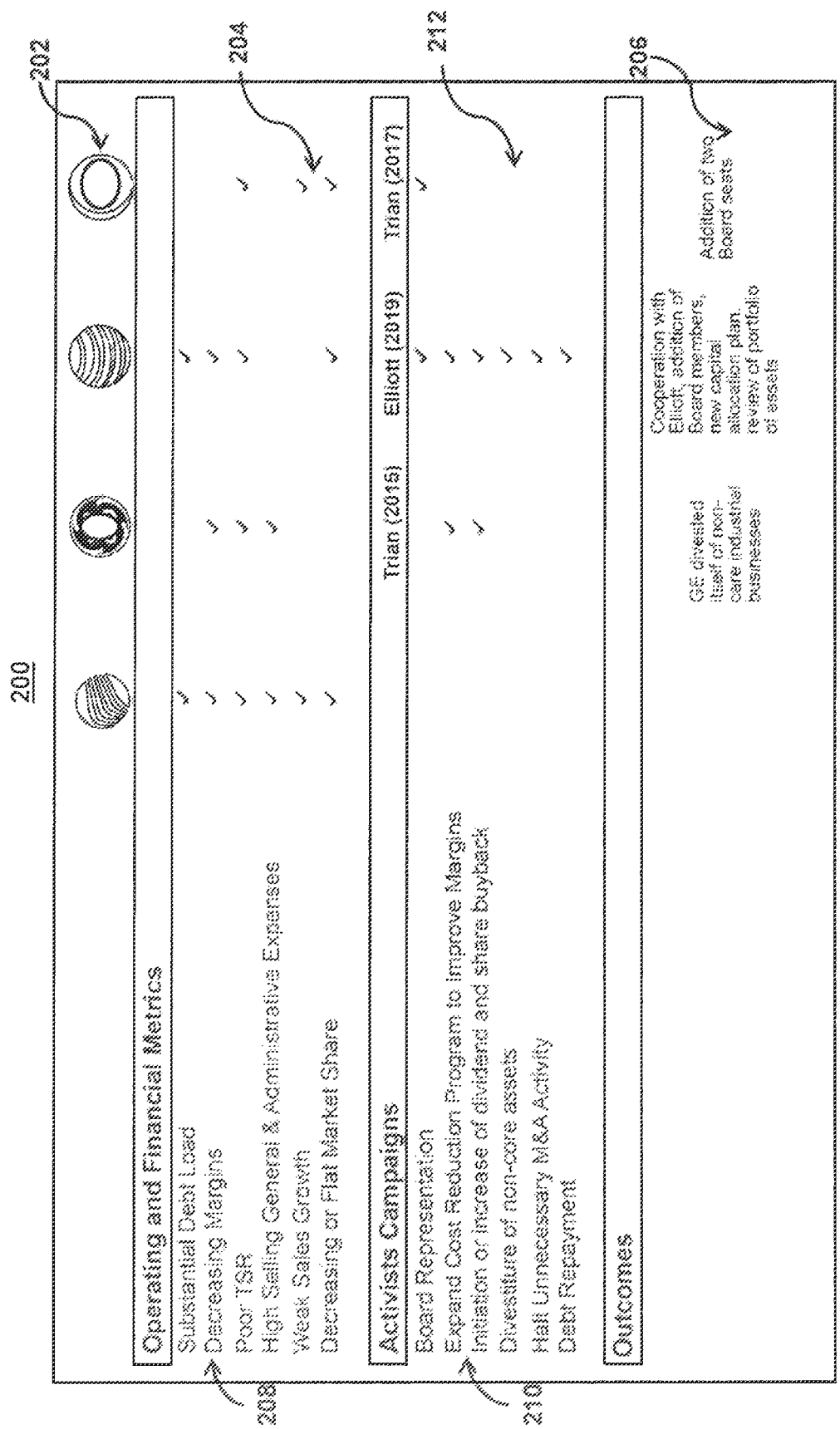
FIG. 2 shows an illustrative example of another instance of a user interface for accessing a comparison of an entity and another entity based on their similarities, in accordance with one or more embodiments.

FIG. 2 shows an illustrative example of another instance of a user interface for accessing a comparison of an entity and another entity based on their similarities, in accordance with one or more embodiments. For example, in some embodiments, the system may receive data related to a management arrangement of an entity, wherein the data comprises a temporal characteristic and a management transformation of the that entity. The system may then determine a similarity of the data and the data for another entity. The system may then generate for display, in a user interface (e.g., user interface 200), a comparison of the entity and the other entity based on the similarity. In some embodiments, the comparison includes an outcome of the management transformation for the entity.

User interface 200 include comparable entities 202. Comparable entities 202 may include a plurality of entities having a threshold similarity (e.g., as discussed below in relation to FIG. 6). User interface 200 may also include one or more categories of management arrangement data for the comparable entities 202 (e.g., category 208). User interface 200 may in some embodiments include a respective value for the categories of management arrangement data for the comparable entities 202 and/or a comparison of the respective values. User interface 200 may further comprise values (e.g., value 204) for one or more categories. These values may be qualitative or qualitative expressions of the presence and/or degree to which each of comparable entities 202 corresponds to category 208.

User interface 200 may also include one or more categories related to management transformations for the comparable entities 202. (e.g., category 210). User interface 200 may in some embodiments include a respective value for the categories of management arrangement data for the management transformations of the comparable entities 202 and/or a comparison of the respective values. User interface 200 may further comprise values (e.g., value 212) for one or more categories. These values may be qualitative or qualitative expressions of the presence and/or degree to which each of comparable entities 202 corresponds to category 210.

User interface 200 may also include recommendations 206. Recommendations 206 may be based on management arrangement data, management transformations, and/or a comparison of categories and values thereof. For example, recommendations 206 may provide qualitative or quantitative representations (e.g., textual, visual, graphical, etc. representations) based on the management arrangement data, management transformations, and/or a comparison of categories and values thereof.

Figure 3:
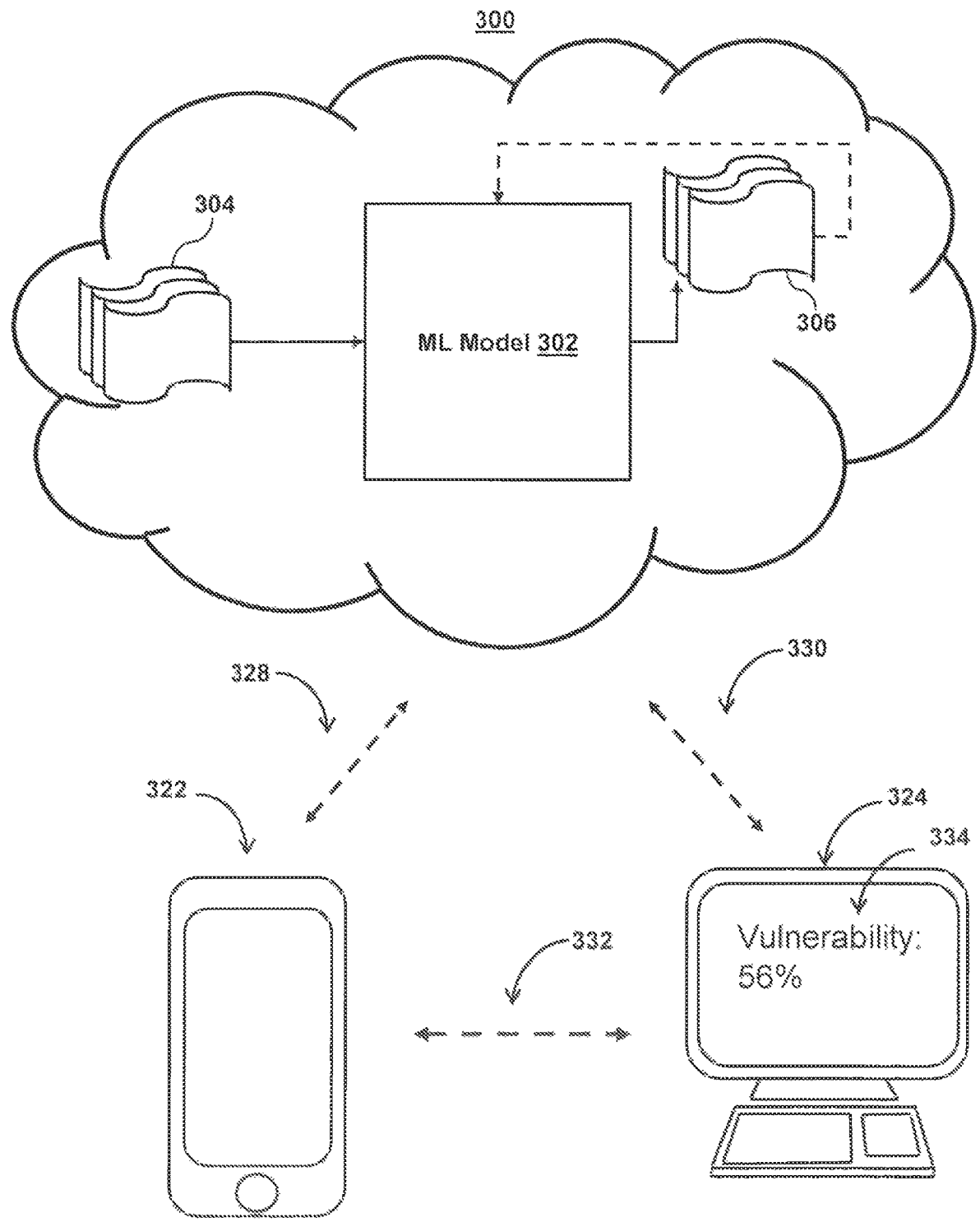
FIG. 3 shows a system for processing data having varied temporal characteristics to generate predictions related to management arrangements using random forest classifiers, in accordance with one or more embodiments.

FIG. 3 shows a system for processing data having varied temporal characteristics to generate predictions related to management arrangements using random forest classifiers, in accordance with one or more embodiments. As shown in FIG. 3, system 300 may include user device 322, user device 324, and/or other components. Each user device may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may be comprised of any suitable processing circuitry. Each of these devices may also include a user input interface and/or display for use in receiving and displaying data (e.g., user interface 100 (FIG. 1)). By way of example, user device 322 and user device 324 may include a desktop computer, a server, or other client device. Users may, for instance, utilize one or more of the user devices to interact with one another, one or more servers, or other components of system 300. It should be noted that, while one or more operations are described herein as being performed by particular components of system 300, those operations may, in some embodiments, be performed by other components of system 300. As an example, while one or more operations are described herein as being performed by components of user device 322, those operations may, in some embodiments, be performed by components of user device 324. System 300 also includes machine learning model 302, which may be implemented on user device 322 and user device 324, or accessible by communication paths 328 and 330, respectively. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices and/or (ii) removable storage that is removably connectable to the servers or client devices via, for example, a port (e.g., a USB port, a firewire port, etc.) or a drive (e.g., a disk drive, etc.). The electronic storages may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

In some embodiments, system 300 may represent a cloud based system that includes multiple cloud based components for providing a software development version control system for monitoring contributor performance for source code programming projects. The cloud-based system may include components such as memory, control circuitry, and/or I/O circuitry. In such embodiments, system 300 and/or one or more functions of system 300 may be dispersed across a plurality of locations and/or devices.

FIG. 3 also includes communication paths 328, 330, and 332. Communication paths 328, 330, and 332 may include the Internet, a mobile phone network, a mobile voice or data network (e.g., a 4G or LTE network), a cable network, a public switched telephone network, or other types of communications network or combinations of communications networks. Communication paths 328, 330, and 332 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 3, machine learning model 302 may take inputs 304 and provide outputs 306. The inputs may include multiple data sets such as a training data set and a test data set. Each of the plurality of data sets (e.g., inputs 304) may include data subsets with common characteristics. For example, inputs 304 may include information about historic, current, and/or future activism campaigns. Additionally or alternatively, inputs 304 may include management arrangement data. As referred to herein, management arrangement data may include fundamental data, income data, market data, trading volume data, shareholder rights data, structure data, size/length of the tenure, number of affiliations, and/or any other data related to management arrangements. The management arrangement data may be pre-processed to be indexed by time.

In some embodiments, machine learning model 302 may be based on a random forest classifier. The random forest classifier may include a plurality of decision trees. Each decision tree may provide an individual classification. The system may then predict a class based on averaging the various individual classifications (or using another operation or function that provides an overall qualitative or quantitative assessment of the individual classifications). The random forest classifier may comprise decision trees with low correlation. For example, the use of decision trees (or models) that are uncorrelated (or diverse) may provide more accurate predictions when used in the random forest classifier.

To ensure diversity, the system may use bootstrap aggregation in which each individual decision tree is able to randomly sample from the dataset with replacements. For example, with a training data set size of N, each individual decision tree may be trained on a subset of the data of the training data set in which replacements ensure that the total size of the training data set remains at the size of N. Additionally or alternatively, the system may use feature randomness to ensure diversity. For example, each decision tree in the random forest may only be able to select from a random subset of features (e.g., as opposed to every possible feature).

However, the use of models based on random forest classifiers for applications related to management arrangements creates an additional technical hurdle. Specifically, applications related to management arrangements require a temporal characteristic (i.e., data is correlated to a specific time/date and the model must account for this correlation in order to make predictions). Accordingly, each feature vector used for training must be indexed by time.

Without proper preservation of this temporal characteristic, applications related to management arrangements cannot be achieved and/or predictions related to future time periods cannot be made. This is particularly problematic for models based on random forest classifiers. Random forest classifiers are conventionally limited in their ability to make predictions based on future points in a time-series. That is, random forest classifiers are limited to classification of a current time. For example, random forest classifiers have no awareness of time. Instead, the random forest classifier takes observations to be independent and identically distributed, in contrast to time series data which is characterized by serial dependence.

To overcome this limitation, the system and methods training data for the random forest classifier is pre-processed to make each feature vector indexed by time. For example, the feature vector for a given entity may include management arrangement data, which may include fundamental data, income data, market data, trading volume data, shareholder rights data, structure data, size/length of the tenure, number of affiliations, and/or any other data related to management arrangements. The time index for the feature vector may correspond to a time of the data in the feature vector.

The pre-processing may include one of more of statistical transformations, detrending, time delay embedding, or feature engineering. This pre-processing may collapse the time series information to be processed by the random forest classifier. Statistical transformations may include Box-Cox transformations (e.g., transforming non-normal dependent variables into a normal shape) or power transformations (e.g., monotonic transformation of data using power functions). Detrending may include processing a series of measurements as a time series and estimating a trend to make estimations and justify statements about tendencies in the data, by relating the measurements to the times at which they occurred. Detrending may include differencing, STL, SEATS. Differencing is a transformation applied to time-series data in order to make it stationary. Time delay embedding relates to including history information in dynamical system models, and feature engineering may include introducing lags, rolling statistics, Fourier terms, time dummies, etc. to the model.

Following the pre-processing, a model using a random forest classifier may then be trained. The trained model may then achieve one or more benefits when applied to applications related to management arrangements. First, the model may provide predictions for not only the likely success of a management transformation (e.g., the likelihood of success of a launched activism campaign), but how likely a management transformation is to occur (e.g., the likelihood that an activism campaign will be launched). Second, the model may provide multiple interpretation tools comparing current entities and/or the management arrangements and management arrangement data for those entities to historical management arrangements and management arrangement data of entities that featured a management transformation in order to provide predictions for the current entity. Additionally or alternatively, the model may provide interpretation tools identifying an impact of a given feature (e.g., a category and/or value of management arrangement data) on a likelihood of success or occurrence of a management transformation. Third, the model may provide outputs that through post-processing may be adjusted based on a given time series as well as other factors (e.g., geographic considerations) to allow the model to be adjustable for particular circumstances.

Post-processing may include transforming an output of the random forest classifier from one probability model to another. For example, an output of the random forest classifier may be a predicted probably based on likelihood ratio. A likelihood ratio is the likelihood that a given test result would be expected in data with a target class to the likelihood that that same result would be expected in a data without the target class. In some embodiments, this probability (or the distribution thereof) may differ from an observed rate. For example, the system may transform the probability from a normal distribution or Bernoulli distribution to a beta distribution where the probability distribution is defined on the interval [0, 1] parametrized by two positive shape parameters, denoted by $\alpha$ and $\beta$, that appear as exponents of the random variable and control the shape of the distribution. In another example, the output of the random forest classifier may be transformed to Bayesian network that represents a set of variables and their conditional dependencies via a directed acyclic graph. The Bayesian network may then be used to determine impact features for a given management transformation.

In some embodiments, outputs 306 may be fed back to machine learning model 302 as input to train machine learning model 302 (e.g., alone or in conjunction with user indications of the accuracy of outputs 306, labels associated with the inputs, or with other reference feedback information). In another embodiment, machine learning model 302 may update its configurations (e.g., weights, biases, or other parameters) based on the assessment of its prediction (e.g., outputs 306) and reference feedback information (e.g., user indication of accuracy, reference labels, or other information). In another embodiment, where machine learning model 302 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions.

In some embodiments, machine learning model 302 may include an artificial neural network. In such embodiments, machine learning model 302 may include input layer and one or more hidden layers. Each neural unit of machine learning model 302 may be connected with many other neural units of machine learning model 302. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Machine learning model 302 may be self-learning and trained, rather than explicitly programmed, and can perform significantly better in certain areas of problem solving, as compared to traditional computer programs. During training, an output layer of machine learning model 302 may corresponds to a classification of machine learning model 302 and an input known to correspond to that classification may be input into an input layer of machine learning model 302 during training. During testing, an input without a known classification may be input into the input layer, and a determined classification may be output.

In some embodiments, machine learning model 302 may include multiple layers (e.g., where a signal path traverses from front layers to back layers). In some embodiments, back propagation techniques may be utilized by machine learning model 302 where forward stimulation is used to reset weights on the "front" neural units. In some embodiments, stimulation and inhibition for machine learning model 302 may be more free flowing, with connections interacting in a more chaotic and complex fashion. During testing, an output layer of machine learning model 302 may indicate whether or not a given input corresponds to a classification of machine learning model 302 (e.g., determine a first length of programming time based on a determined average length of programming time for a given first resolution type).

As shown in FIG. 3, machine learning model 302 has generated output an output of prediction 334, which is displayed on user device 324. Prediction 334 may include additional information as described in FIGS. 4-6 below as well as information described in FIGS. 1-2 above. For example, in some embodiments, prediction 334 may correspond to an instance of user interface 100 (FIG. 1) or user interface 200 (FIG. 2).

Figure 4:
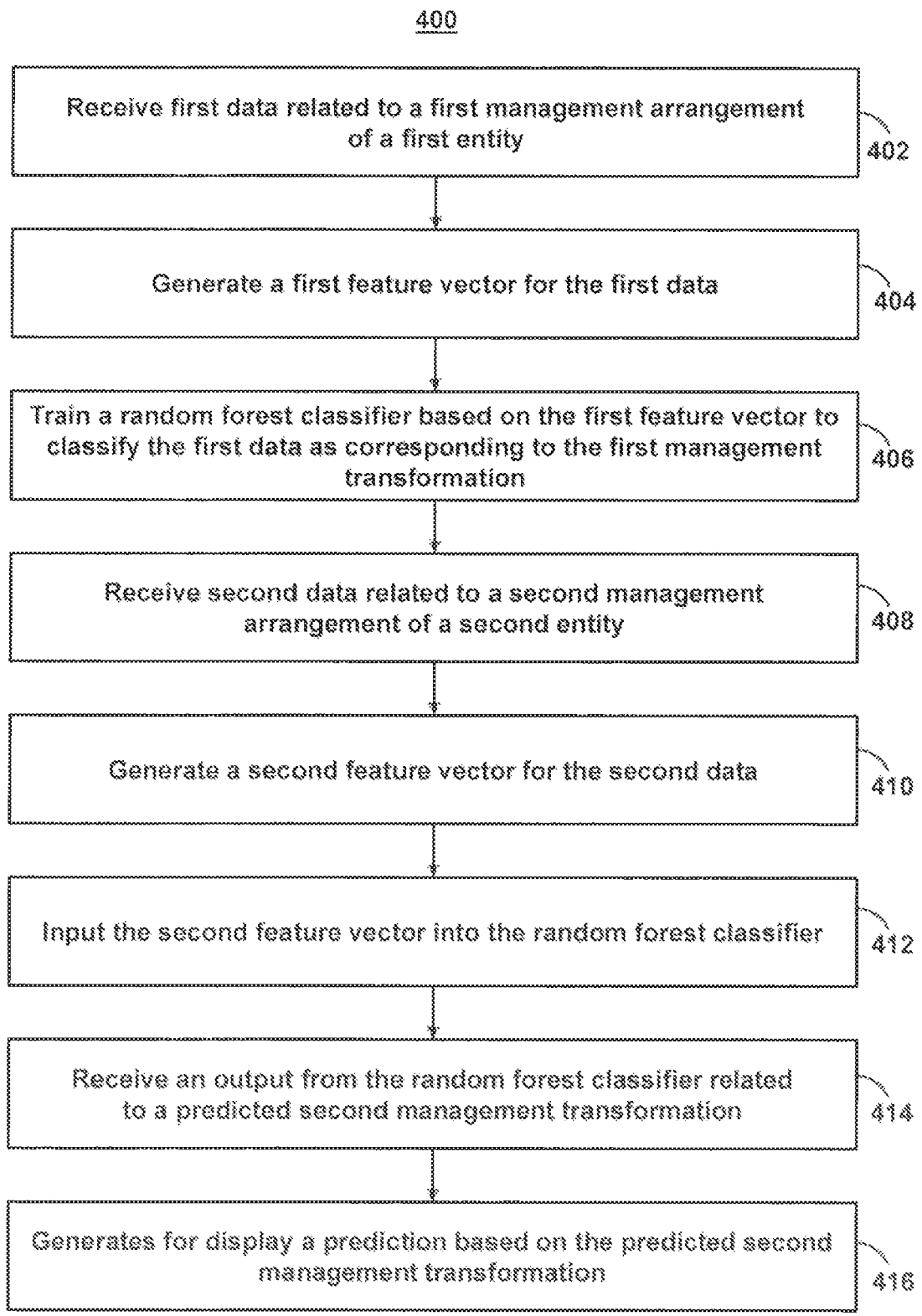
FIG. 4 shows a flowchart of the steps involved in processing data having varied temporal characteristics to generate predictions related to management arrangements using random forest classifiers, in accordance with one or more embodiments.

FIG. 4 shows a flowchart of the steps involved in processing data having varied temporal characteristics to generate predictions related to management arrangements using random forest classifiers, in accordance with one or more embodiments. For example, process 400 may represent the steps taken by one or more devices as shown in FIGS. 1-3.

At step 402, process 400 (e.g., via control circuitry of one or more components of system 300 (FIG. 3)) receives first data related to a first management arrangement of a first entity. For example, the system may receive, using control circuitry, first data related to a first management arrangement of a first entity, wherein the first data comprises a first temporal characteristic (e.g., a date) and a first management transformation (e.g., a launching of an activism campaign) of the first entity. For example, the first management transformation may comprise a launching of a first activism campaign against the first management arrangement. The temporal characteristic may relate to a past date.

At step 404, process 400 (e.g., via control circuitry of one or more components of system 300 (FIG. 3)) generates a first feature vector for the first data. For example, the system may generate, using the control circuitry, a first feature vector for the first data, wherein a first element of the first feature vector corresponds to the first temporal characteristic. The temporal characteristic may correspond to a time value that is indexed with the feature vector. The time value may indicate a date of the management arrangement data corresponding to the feature vector.

At step 406, process 400 (e.g., via control circuitry of one or more components of system 300 (FIG. 3)) trains a random forest classifier based on the first feature vector to classify the first data as corresponding to the first management transformation. For example, the system may train, using the control circuitry, a random forest classifier based on the first feature vector to classify the first data as corresponding to the first management transformation. In some embodiments, training the random forest classifier based on the first feature vector to classify the first data as corresponding to the first management transformation comprises back testing the random forest classifier against historical data related to historical management arrangements and historical management transformations. For example, the system may estimate the performance of the random forest classifier as if it had been employed during a past period using back testing. In such cases, the system may simulate past conditions with sufficient detail using historical data. In some embodiments, the system may limit back testing in order to prevent overfitting and/or may adopt additional training techniques to prevent overfitting.

In some embodiments, the random forest classifier may be a time series classifier, and the predicted second management transformation may a temporal characteristic distinct from other temporal characteristics. For example, the temporal characteristic of the predicted second management transformation may be in the future.

At step 408, process 400 (e.g., via control circuitry of one or more components of system 300 (FIG. 3)) receives second data related to a second management arrangement of a second entity. For example, the system may receive, using the control circuitry, second data related to a second management arrangement of a second entity, wherein the second data comprises a second temporal characteristic (e.g., a date) and an unknown management transformation (e.g., whether or not an activism campaign will be launched) of the second entity. The temporal characteristic may relate to a current or future date. In some embodiments, the system may receive a user input (e.g., via user interface 100 (FIG. 1) or user interface 200 (FIG. 2)) initiating a review of publicly available data related to management arrangements for a plurality of entities. In response to the review, the system may query a data source (e.g., a data source incorporated into and/or accessible by system 300 (FIG. 3)) for the second data, wherein the second data is received in response to the query.

At step 410, process 400 (e.g., via control circuitry of one or more components of system 300 (FIG. 3)) generates a second feature vector for the second data. For example, the system may generate, using the control circuitry, a second feature vector for the second data, wherein a second element of the second feature vector corresponds to the second temporal characteristic.

At step 412, process 400 (e.g., via control circuitry of one or more components of system 300 (FIG. 3)) inputs the second feature vector into the random forest classifier. For example, the system may input, using the control circuitry, the second feature vector into the random forest classifier.

At step 414, process 400 (e.g., via control circuitry of one or more components of system 300 (FIG. 3)) receives an output from the random forest classifier related to a predicted second management transformation. For example, the system may receive, using the control circuitry, an output from the random forest classifier related to a predicted second management transformation.

At step 416, process 400 (e.g., via control circuitry of one or more components of system 300 (FIG. 3)) generates for display a prediction based on the predicted second management transformation. For example, the system may generate for display, in a user interface, a prediction based on the predicted second management transformation. In some embodiments, the first management transformation may comprise a launching of a first activism campaign against the first management arrangement, and the prediction based on the predicted second management transformation may comprise a probability of a launching of a second activism campaign against the second management arrangement.

In some embodiments, the system may further perform additional steps in order to generate one or more features as shown in FIGS. 1-2. For example, the system may transform the output from an exponential distribution to a probability based on a Bayes classifier, wherein the prediction includes the probability. Additionally or alternatively, the system may generate predictions with specific information. For example, the system may determine a first datum (e.g., a share price field or category of the first entity) of the first data that is indicative of the first management transformation. The system may then determine a second datum of the second data that corresponds to the first datum (e.g., a share price field or category of the second entity). The system may then generate for display a representation of the second datum in the prediction. Additionally or alternatively, the system may generate information about a specific value (e.g., a share price value). For example, the system may determine a first value (e.g., a share price value of the first entity) for the first datum that is indicative of the first management transformation. The system may then determine a second value (e.g., a share price value of the second entity) of the second datum that corresponds to the first value. The system may then generate for display a representation of the second value in the prediction.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 could be used to perform one of more of the steps in FIG. 4.

Figure 5:
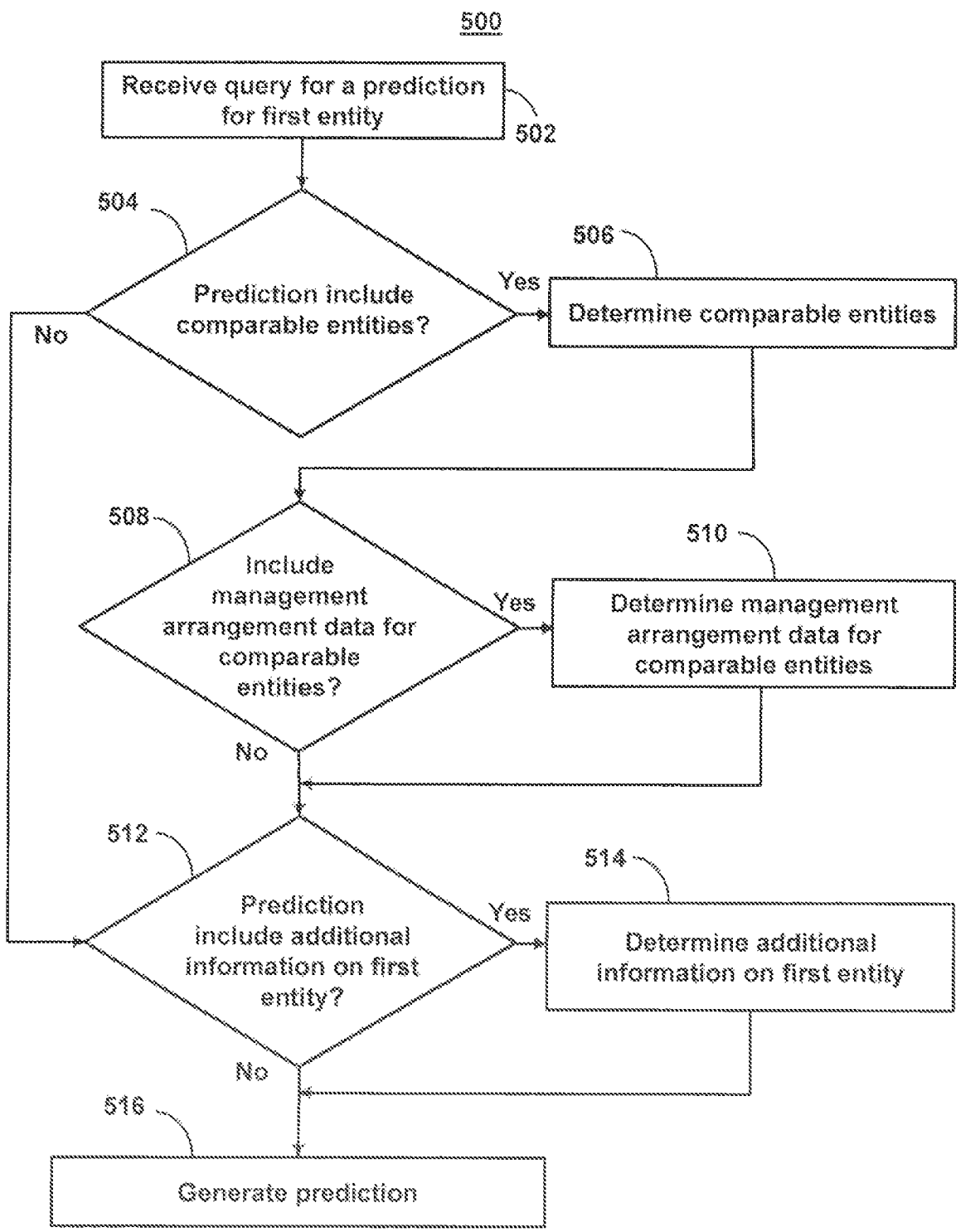
FIG. 5 shows a flowchart of the steps involved in generating predictions with varied types of data, in accordance with one or more embodiments.

FIG. 5 shows a flowchart of the steps involved in generating predictions with varied types of data, in accordance with one or more embodiments. For example, the system may generate for display respective predictions for a plurality of entities based on publicly available data related to management arrangements for the plurality of entities. Additionally or alternatively, the system may rank an entity among the plurality of entities based on a comparison of the prediction and the respective predictions. For example, process 500 may represent the steps taken by one or more devices as shown in FIGS. 1-3.

At step 502, process 500 (e.g., via control circuitry of one or more components of system 300 (FIG. 3)) receives a query for a prediction for a first entity. For example, the query may be generated by the system in response to a user accessing user interface 100 (FIG. 1) and/or selecting an icon in user interface 100 (FIG. 1)).

At step 504, process 500 (e.g., via control circuitry of one or more components of system 300 (FIG. 3)) determines whether the prediction includes comparable entities. If so, process 500 proceeds to step 506. For example, the system may use various criteria when determine what information to include in a prediction as well as what information should accompany a prediction. The system may select the one or more criteria based on a user inputs or automatically based on application settings. If not, process 500 proceeds to step 512.

At step 506, process 500 (e.g., via control circuitry of one or more components of system 300 (FIG. 3)) determines comparable entities for use in generating the prediction. For example, in some embodiments, this may include determining the similarity between two entities as discussed below in FIG. 6. In response to determining the comparable entities, the system may store the comparable entities (or information identifying the comparable entities) and proceed to step 508.

At step 508, process 500 (e.g., via control circuitry of one or more components of system 300 (FIG. 3)) determines whether the prediction includes management arrangement data for comparable entities. If so, process 500 proceeds to step 510. If not, process 500 proceeds to step 512.

At step 510, process 500 (e.g., via control circuitry of one or more components of system 300 (FIG. 3)) determines management arrangement data for comparable entities. For example, in some embodiments, this may include determining information about the entities for use in comparing that information to current or past information of the first entity. For example, the system may determine a first datum (e.g., a board composition field or category of the first entity) of the first data that is indicative of the first management transformation. The system may then determine a second datum of the second data that corresponds to the first datum (e.g., a board composition field or category of the second entity). The system may then generate for display a representation of the second datum in the prediction. Additionally or alternatively, the system may generate information about a specific value (e.g., a value indicative of the board composition such as the number of board members and/or other value that represents a quantitative or qualitative assessment of the composition). For example, the system may determine a first value (e.g., a board composition value of the first entity) for the first datum that is indicative of the first management transformation. The system may then determine a second value (e.g., a board composition value of the second entity) of the second datum that corresponds to the first value.

At step 512, process 500 (e.g., via control circuitry of one or more components of system 300 (FIG. 3)) determines whether the prediction includes any additional information. If so, process 500 proceeds to step 514. If not, process 500 proceeds to step 516.

At step 514, process 500 (e.g., via control circuitry of one or more components of system 300 (FIG. 3)) determines additional information on first entity. For example, the additional information may comprise any of the information shown in FIGS. 1-2 related to the first entity. This may include name, income data, market data, trading volume, shareholder rights, etc. and/or any other information that may be relevant to an assessment of a management arrangement.

At step 516, process 500 (e.g., via control circuitry of one or more components of system 300 (FIG. 3)) generates the prediction based on the information determined during process 500. For example, the information determined during process 500 may be used by the system to populate a user interface (e.g., user interface 100 (FIG. 1) or user interface 200 (FIG. 2)).

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 could be used to perform one or more of the steps in FIG. 5.

Figure 6:
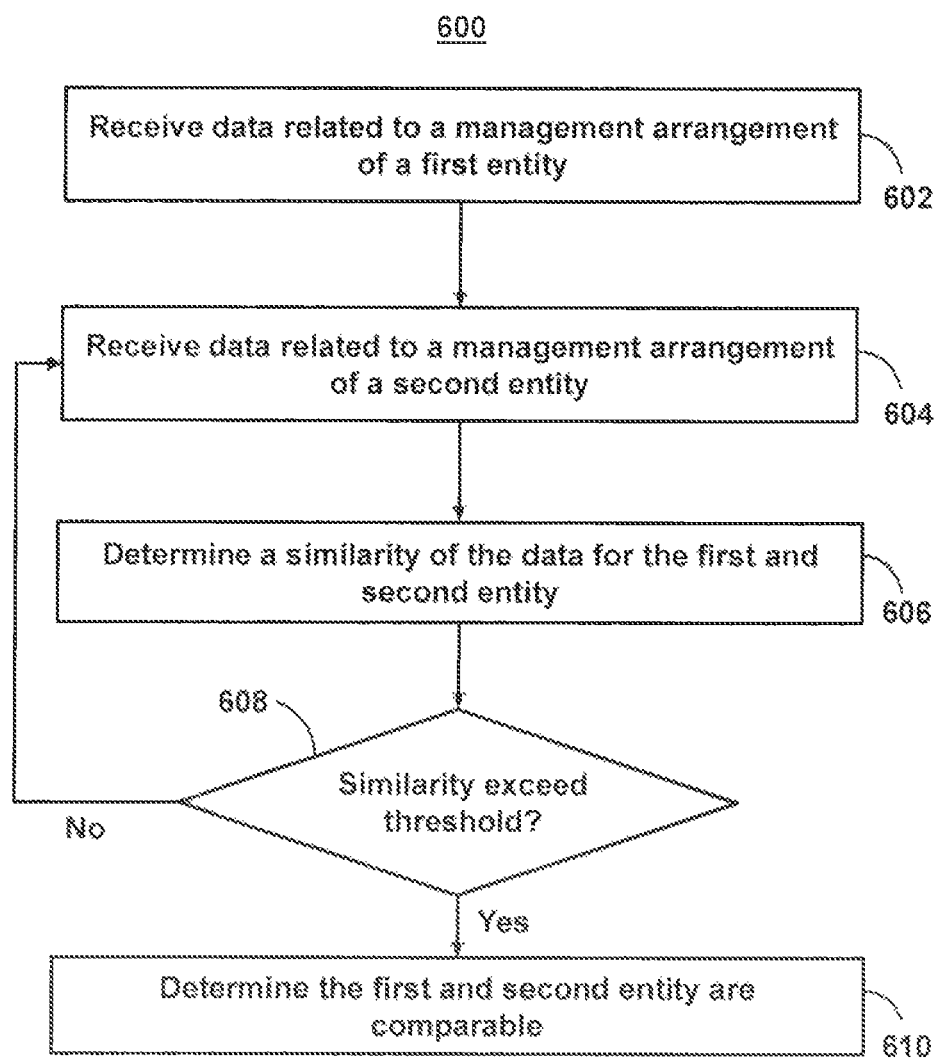
FIG. 6 shows a flowchart of the steps involved in generating a comparison of an entity and another entity based on their similarities, in accordance with one or more embodiments.

FIG. 6 shows a flowchart of the steps involved in generating a comparison of an entity and another entity based on their similarities, in accordance with one or more embodiments. For example, in some embodiments, the system may receive data related to a management arrangement of an entity, wherein the data comprises a temporal characteristic and a management transformation of the that entity. The system may then determine a similarity of the data and the data for another entity. The system may then generate for display, in a user interface (e.g., user interface 200 (FIG. 2)), a comparison of the entity and the other entity based on the similarity. In some embodiments, the comparison includes an outcome of the management transformation for the entity. For example, process 600 may represent the steps taken by one or more devices as shown in FIGS. 1-3.

At step 602, process 600 (e.g., via control circuitry of one or more components of system 300 (FIG. 3)) receives data related to a management arrangement of a first entity. For example, for a given entity, the system (e.g., model 302 (FIG. 3)) identifies comparable entities that are most similar in terms of their most relevant metrics related to management arrangement, management arrangement data, management transformations, and/or management transformation data, and/or have been subject to management transformations (e.g., activism campaigns) in the past.

At step 604, process 600 (e.g., via control circuitry of one or more components of system 300 (FIG. 3)) receives data related to a management arrangement of a second entity. In some embodiments, the system may retrieve the second entity from a similar industry. In some embodiments, the system may determine similarities between entities from different industries (e.g., the system may not exclude entities from different industry from being designated as similar. For example, the system may determine "effective peer groups" based on the similarity of the underlying management arrangement data in the context of precedent management transformation situations.

At step 606, process 600 (e.g., via control circuitry of one or more components of system 300 (FIG. 3)) determines a similarity of the data for the first and second entity. For example, the similarities between the historically targeted entities and the first entity can point towards the specific reasons why the first entity is likely subject to a management transformation.

At step 608, process 600 (e.g., via control circuitry of one or more components of system 300 (FIG. 3)) determines whether the similarity exceeds a threshold. For example, the system may retrieve a threshold based on the number of entities, industry, time period, and/or other factors. The threshold may be determined based on industry standards and/or adjusted by a user (e.g., via user interface 100 (FIG. 1)). If so, process 600 proceeds to step 610. If the similarity does not exceed the threshold, process 600 returns to step 604 and receives data on a different entity.

At step 610, process 600 (e.g., via control circuitry of one or more components of system 300 (FIG. 3)) determines that the first and second entity are comparable. For example, in response to determining that the first and second entity are comparable, the system may determine additional information about the second entity (e.g., for use in generating a comparison of the first and second entities). In some embodiments, the system may determine to use the second entity in an instance of a user interface comparing similar entities (e.g., as shown in FIG. 2). For example, the system may determine a given set of "comparable historical activism situations," and generate for display the commonalities between the management transformations allows the system to generate recommendations (e.g., recommendations 206 (FIG. 2)) to users related to factor that triggered and/or impactful features for the management transformation.

In some embodiments, the system may combine the high impact feature analysis with peer comparisons of traditional metrics to generate a prediction with a comprehensive narrative (e.g., presented as a recommendation in user interface 100 (FIG. 1)). For example, the system may list the features which have the highest impact on making an entity more or less likely to have a management transformation. The system may use a statistical learning model such that that the high impact features are the model inputs that have the strongest statistical associations with the model output (e.g., likelihood of a management transformation).

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method of processing data having varied temporal characteristics to generate predictions related to management arrangements using random forest classifiers, the method comprising: receiving, using control circuitry, first data related to a first management arrangement of a first entity, wherein the first data comprises a first temporal characteristic and a first management transformation of the first entity; generating, using the control circuitry, a first feature vector for the first data, wherein a first element of the first feature vector corresponds to the first temporal characteristic; training, using the control circuitry, a random forest classifier based on the first feature vector to classify the first data as corresponding to the first management transformation; receiving, using the control circuitry, second data related to a second management arrangement of a second entity, wherein the second data comprises a second temporal characteristic and an unknown management transformation of the second entity; generating, using the control circuitry, a second feature vector for the second data, wherein a second element of the second feature vector corresponds to the second temporal characteristic; inputting, using the control circuitry, the second feature vector into the random forest classifier; receiving, using the control circuitry, an output from the random forest classifier related to a predicted second management transformation; and generating for display, in a user interface, a prediction based on the predicted second management transformation.

2. The method of embodiment 1, further comprising transforming the output from an exponential distribution to a probability based on a Bayes classifier, wherein the prediction includes the probability.

3. The method of embodiment 1 or 2, further comprising: determining a first datum of the first data that is indicative of the first management transformation; determining a second datum of the second data that corresponds to the first datum; and generating for display a representation of the second datum in the prediction.

4. The method of embodiment 3, further comprising: determining a first value for the first datum that is indicative of the first management transformation; determining a second value of the second datum that corresponds to the first value; and generating for display a representation of the second value in the prediction.

5. The method of any one of embodiments 1-4, wherein the random forest classifier is a time series classifier, and wherein the predicted second management transformation has a third temporal characteristic.

6. The method of any one of embodiments 1-5, wherein the first management transformation comprises a launching of a first activism campaign against the first management arrangement, and wherein the prediction based on the predicted second management transformation comprises a probability of a launching of a second activism campaign against the second management arrangement.

7. The method of any one of embodiments 1-6, wherein training the random forest classifier based on the first feature vector to classify the first data as corresponding to the first management transformation comprises backtesting the random forest classifier against historical data related to historical management arrangements and historical management transformations.

8. The method of any one of embodiments 1-7, further comprising: receiving a user input initiating a review of publicly available data related to management arrangements for a plurality of entities; and in response to the review, query a data source for the second data, wherein the second data is received in response to the query.

9. The method of any one of embodiments 1-8, further comprising: generating for display respective predictions for a plurality of entities based on publicly available data related to management arrangements for the plurality of entities; and ranking the second entity among the plurality of entities based on a comparison of the prediction and the respective predictions.

10. The method of any one of embodiments 1-9, further comprising: receiving third data related to a third management arrangement of a third entity, wherein the third data comprises a third temporal characteristic and a third management transformation of the third entity; determining a similarity of the third data and the second data; and generating for display, in the user interface, a comparison of the second entity and the third entity based on the similarity, wherein the comparison includes an outcome of the third management transformation.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A method of processing data having varied temporal characteristics to generate predictions related to management arrangements using random forest classifiers, the method comprising:
   receiving, using control circuitry, first data related to a first management arrangement of a first entity, wherein the first data comprises a first temporal characteristic and a first management transformation of the first entity;
   generating, using the control circuitry, a first feature vector for the first data, wherein a first element of the first feature vector corresponds to the first temporal characteristic whereby the first feature vector is indexed by time;
   training, using the control circuitry, a temporally unaware random forest classifier in which observations are taken to be independent and identically distributed based on the first feature vector to classify the first data as corresponding to the first management transformation;
   receiving, using the control circuitry, second data related to a second management arrangement of a second entity, wherein the second data comprises a second temporal characteristic and an unknown management transformation of the second entity;
   generating, using the control circuitry, a second feature vector for the second data, wherein a second element of the second feature vector corresponds to the second temporal characteristic whereby the second feature vector is indexed by time;

inputting, using the control circuitry, the second feature vector into the temporally unaware random forest classifier;

receiving, using the control circuitry, an output from the temporally unaware random forest classifier related to a predicted second management transformation; and generating for display, in a user interface, a prediction based on the predicted second management transformation.

2. The method of claim 1, further comprising transforming the output from an exponential distribution to a probability based on a Bayes classifier, wherein the prediction includes the probability.

3. The method of claim 1, further comprising:
determining a first datum of the first data that is indicative of the first management transformation;
determining a second datum of the second data that corresponds to the first datum; and
generating for display a representation of the second datum in the prediction.

4. The method of claim 3, further comprising:
determining a first value for the first datum that is indicative of the first management transformation;
determining a second value of the second datum that corresponds to the first value; and
generating for display a representation of the second value in the prediction.

5. The method of claim 1, wherein the random forest classifier is a time series classifier, and wherein the predicted second management transformation has a third temporal characteristic.

6. The method of claim 1, wherein the first management transformation comprises a launching of a first activism campaign against the first management arrangement, and wherein the prediction based on the predicted second management transformation comprises a probability of a launching of a second activism campaign against the second management arrangement.

7. The method of claim 1, wherein training the random forest classifier based on the first feature vector to classify the first data as corresponding to the first management transformation comprises backtesting the random forest classifier against historical data related to historical management arrangements and historical management transformations.

8. The method of claim 1, further comprising:
receiving a user input initiating a review of publicly available data related to management arrangements for a plurality of entities; and
in response to the review, query a data source for the second data, wherein the second data is received in response to querying the data source.

9. The method of claim 1, further comprising:
generating for display respective predictions for a plurality of entities based on publicly available data related to management arrangements for the plurality of entities; and
ranking the second entity among the plurality of entities based on a comparison of the prediction and the respective predictions.

10. The method of claim 1, further comprising:
receiving third data related to a third management arrangement of a third entity, wherein the third data comprises a third temporal characteristic and a third management transformation of the third entity;
determining a similarity of the third data and the second data; and generating for display, in the user interface, a comparison of the second entity and the third entity based on the similarity, wherein the comparison includes an outcome of the third management transformation.

11. A non-transitory computer-readable medium for processing data having varied temporal characteristics to generate predictions related to management arrangements using random forest classifiers, comprising instructions that, when executed by one or more processors, cause operations comprising:
receiving first data related to a first management arrangement of a first entity, wherein the first data comprises a first temporal characteristic and a first management transformation of the first entity;
generating a first feature vector for the first data, wherein a first element of the first feature vector corresponds to the first temporal characteristic whereby the first feature vector is indexed by time;
training a temporally unaware random forest classifier based on the first feature vector to classify the first data as corresponding to the first management transformation;
receiving second data related to a second management arrangement of a second entity, wherein the second data comprises a second temporal characteristic and an unknown management transformation of the second entity;
generating a second feature vector for the second data, wherein a second element of the second feature vector corresponds to the second temporal characteristic whereby the second feature vector is indexed by time;
inputting the second feature vector into the temporally unaware random forest classifier;
receiving an output from the temporally unaware random forest classifier related to a predicted second management transformation; and
generating for display, in a user interface, a prediction based on the predicted second management transformation.

12. The non-transitory computer-readable medium of claim 11, wherein the instructions further cause operations comprising transforming the output from an exponential distribution to a probability based on a Bayes classifier, wherein the prediction includes the probability.

13. The non-transitory computer-readable medium of claim 11, wherein the instructions further cause operations comprising:
determining a first datum of the first data that is indicative of the first management transformation;
determining a second datum of the second data that corresponds to the first datum; and
generating for display a representation of the second datum in the prediction.

14. The non-transitory computer-readable medium of claim 13, wherein the instructions further cause operations comprising:
determining a first value for the first datum that is indicative of the first management transformation;
determining a second value of the second datum that corresponds to the first value; and
generating for display a representation of the second value in the prediction.

15. The non-transitory computer-readable medium of claim 11, wherein the random forest classifier is a time series classifier, and wherein the predicted second management transformation has a third temporal characteristic.

16. The non-transitory computer-readable medium of claim 11, wherein the first management transformation comprises a launching of a first activism campaign against the first management arrangement, and wherein the prediction based on the predicted second management transformation comprises a probability of a launching of a second activism campaign against the second management arrangement.

17. The non-transitory computer-readable medium of claim 11, wherein training the random forest classifier based on the first feature vector to classify the first data as corresponding to the first management transformation comprises backtesting the random forest classifier against historical data related to historical management arrangements and historical management transformations.

18. The non-transitory computer-readable medium of claim 11, wherein the instructions further cause operations comprising:
    receiving a user input initiating a review of publicly available data related to management arrangements for a plurality of entities; and
    in response to the review, query a data source for the second data, wherein the second data is received in response to querying the data source.

19. The non-transitory computer-readable medium of claim 11, wherein the instructions further cause operations comprising:
    generating for display respective predictions for a plurality of entities based on publicly available data related to management arrangements for the plurality of entities; and
    ranking the second entity among the plurality of entities based on a comparison of the prediction and the respective predictions.

20. The non-transitory computer-readable medium of claim 11, wherein the instructions further cause operations comprising:
    receiving third data related to a third management arrangement of a third entity, wherein the third data comprises a third temporal characteristic and a third management transformation of the third entity;
    determining a similarity of the third data and the second data; and
    generating for display, in the user interface, a comparison of the second entity and the third entity based on the similarity, wherein the comparison includes an outcome of the third management transformation.

* * * * *